(12) United States Patent
Li

(10) Patent No.: US 8,651,800 B2
(45) Date of Patent: Feb. 18, 2014

(54) INDUCTION SYSTEM WITH AIR FLOW ROTATION AND NOISE ABSORBER FOR TURBOCHARGER APPLICATIONS

(75) Inventor: Lei Li, Whitby (CA)

(73) Assignee: GM Global Technology Operations LLP, Detroit, MI (US)

( * ) Notice: Subject to any disclaimer, the term of this patent is extended or adjusted under 35 U.S.C. 154(b) by 710 days.

(21) Appl. No.: 12/794,245

(22) Filed: Jun. 4, 2010

(65) Prior Publication Data

US 2011/0299981 A1 Dec. 8, 2011

(51) Int. Cl.
*F04D 29/44* (2006.01)

(52) U.S. Cl.
USPC .............. 415/71; 415/73; 415/74; 415/76; 415/119; 416/176; 416/177

(58) Field of Classification Search
USPC .......... 415/71, 72, 73, 74, 76, 119; 416/176, 416/177; 138/39; 123/306, 308, 590, 592, 123/593
See application file for complete search history.

(56) References Cited

U.S. PATENT DOCUMENTS

| | | | | |
|---|---|---|---|---|
| 1,005,204 | A | * | 10/1911 | Harper .............................. 415/74 |
| 1,143,255 | A | * | 6/1915 | Dornes ............................. 415/74 |
| 3,712,416 | A | * | 1/1973 | Swanson et al. ............. 181/229 |
| 4,236,597 | A | | 12/1980 | Kiss et al. |
| 4,326,865 | A | | 4/1982 | Siebels |
| 4,792,014 | A | * | 12/1988 | Shin-Seng ..................... 181/280 |
| 4,969,536 | A | | 11/1990 | Allen |
| 5,260,524 | A | | 11/1993 | Schroeder et al. |
| 5,323,661 | A | | 6/1994 | Cheng |
| 5,662,079 | A | | 9/1997 | Snider |
| 5,679,931 | A | | 10/1997 | Furse et al. |
| 5,681,075 | A | | 10/1997 | Komori et al. |
| 5,696,361 | A | | 12/1997 | Chen |
| 5,915,354 | A | * | 6/1999 | Ma .................................. 123/308 |
| 5,979,598 | A | | 11/1999 | Wolf et al. |
| 6,105,716 | A | | 8/2000 | Morehead et al. |
| 6,662,892 | B2 | | 12/2003 | Falk et al. |
| 6,688,425 | B2 | | 2/2004 | Cole et al. |
| 6,881,237 | B2 | | 4/2005 | Storz et al. |
| 7,017,706 | B2 | | 3/2006 | Brown et al. |
| 7,387,188 | B2 | * | 6/2008 | Keller et al. ................... 181/250 |
| 7,631,726 | B2 | | 12/2009 | McWilliam et al. |
| 2003/0173146 | A1 | | 9/2003 | Wolf et al. |

(Continued)

FOREIGN PATENT DOCUMENTS

DE 19703414 A1 8/1998
DE 10261789 A1 7/2008

(Continued)

OTHER PUBLICATIONS

Translation of WO 02/101227, Prior art supplied by applicant.*

(Continued)

*Primary Examiner* — Igor Kershteyn

(57) ABSTRACT

An air induction system consisting of a cylindrical main flow tube, a helical vane disposed within the main flow tube, and, preferably, a noise absorbing perforated tube disposed within the main flow tube in concentric relation to the helical vane. The twist direction of the helical vane provides air flow rotation in the same direction of rotation as the turbine wheel. The helical vane causes noise reflection and enhancement of noise attenuation by the perorated tube and its adjoining one or more acoustic cavities.

3 Claims, 4 Drawing Sheets

(56) References Cited

U.S. PATENT DOCUMENTS

| | | |
|---|---|---|
| 2004/0011011 A1 | 1/2004 | Storz et al. |
| 2006/0032700 A1 | 2/2006 | Vizanko |
| 2008/0210188 A1 | 9/2008 | Koss |
| 2009/0241888 A1* | 10/2009 | Koss ........................ 123/184.53 |
| 2009/0314241 A1 | 12/2009 | Koss et al. |
| 2011/0067681 A1* | 3/2011 | Stevens et al. ............... 124/51.1 |
| 2011/0088393 A1* | 4/2011 | Romblom et al. ........... 60/605.2 |

FOREIGN PATENT DOCUMENTS

| | | |
|---|---|---|
| EP | 1416123 A2 | 5/2004 |
| JP | 2003002292 A | 1/2003 |
| WO | WO02101227 A1 | 12/2002 |
| WO | WO2006090152 A1 | 8/2006 |

OTHER PUBLICATIONS

German Office Action dated Jul. 26, 2012 for German patent application 10 2011 102 838.6 corresponding to U.S. Appl. No. 12/794,245.

"Acoustics of Ducts and Mufflers" by M. L. Munjal, John Wiley & Sons, New York, 1987; pp. 1, 46, 50-51, 147-150, and 298.

"Briggs and Stratton Air Filters" web catalog at http://www.mgindustrialengines.com/airfilters-briggs-stratton.html of MG Industrial Engines, Inc. of Seffner, FL 33584, 2 web pages (3 pdf print pages), believed dated before Mar. 2006. Filter products shown are examples of filters having a metal screen in front.

"Helmholtz Resonance" Wikipedia online encyclopedia, http://en.wikipedia.org/wiki/Helmholtz_resonance (Jan. 4, 2008).

"Airbox" Wikipedia online encyclopedia, http://en.wikipedia.org/wiki/Airbox (Sep. 14, 2007).

* cited by examiner

INDUCTION SYSTEM WITH AIR FLOW ROTATION AND NOISE ABSORBER FOR TURBOCHARGER APPLICATIONS

TECHNICAL FIELD

The present invention relates to air induction systems for turbochargers, and more particularly to an air induction system which imparts air flow rotation upstream of, and rotationally in the same direction as, the turbocharger turbine wheel, and which, further, attenuates turbocharger noise.

BACKGROUND OF THE INVENTION

Turbochargers for internal combustion engines utilize a rotating turbine wheel to draw air from an upstream air induction housing and deliver the air, now under compression, to a downstream engine intake manifold. Problematically, the turbocharger requires power to operate, inclusive not only of the power needed to rotate the turbine wheel but also to overcome pressure losses in the air induction housing. Problematically further, the turbocharger produces noise during its operation which can undesirably exit at the air entry port of the air induction housing.

When an air induction system for a turbocharger is designed, taken into account, for example, are air flow mechanics, vehicle dynamics, material science, and manufacturing processes, as well as other factors as may pertain to the system application. Minimization of pressure loss at the air intake housing and lowering of turbocharger noise exiting therefrom are a challenge, particularly in view of increasing demands for improved engine performance, turbocharger drivability, fuel economy, and emissions reduction. Accordingly, turbocharger air induction systems have become highly engineered products, integrating sensors, vibration decoupling, noise tuners and emission control devices, among others. As a result of these integrated components, air induction systems are prone to being ever more air flow restrictive.

Accordingly, what remains in the art of turbocharger air induction housings is to somehow engineer an air induction housing which minimizes pressure losses, assists the functionality of the turbine wheel, and minimizes escape of turbocharger noise.

SUMMARY OF THE INVENTION

The present invention is an improved air induction system for a turbocharger which minimizes pressure losses, assists the functionality of the turbine wheel, and minimizes escape of turbocharger noise.

The improved air induction system according to the present invention consists of a cylindrical main flow tube, a helical vane disposed within the main flow tube, and, preferably, a noise absorbing perforated tube disposed within the main flow tube in concentric relation to the helical vane such that the helical vane and the perforated tube are concentrically positioned in the air flow path of the main flow tube.

The helical vane has a spiraling body which twists axially along the main flow tube so as to guide air flow axially along the main flow tube and thereby cause the flowing air to acquire a rotation. The twist direction of the spiraling body of the helical vane is coordinated with the known rotation direction of the turbine wheel of the turbocharger so that the acquired rotation of the flowing air is in the same direction of rotation as that of the turbine wheel.

The noise absorbing perforated tube is separated from the main flow tube so as to form an acoustic cavity between the sidewall of the main flow tube and the sidewall of the perforated tube. The perforated tube dissipates acoustic energy via the perforations and the acoustic cavity when sound waves propagate through the air flow of the air induction housing.

The length of the perforated tube, the size of the acoustic cavity, the perforation distribution, and the helical twist angle of the helical vane are among the parameters which may be varied to achieve the desired performance levels of air flow rotation and noise attenuation for a particular application.

The acquired air flow rotation provided by the air induction system according to the present invention has a number of advantages. Because the acquired air flow rotation is in the same rotational direction as the turbine wheel rotation, the dynamic pressure load on the compressor blades is reduced. This pressure load reduction increases turbocharger efficiency and more than compensates for the pressure loss of the air intake housing. As a consequence, the turbine wheel generates less heat, vibration and noise, with the added benefit of improved durability. An additional advantage involves the synergism of the helical vane with respect to the perforated tube, in that the acquired rotation of the air flow encourages sound waves to deflect their propagation direction so as to pass radially through the perforations and into the acoustic cavity, thereby reducing noise from the turbocharger exiting the air entry port of the air induction housing. In addition, the spiral vane reflects acoustic energy back into the turbocharger due to a change in acoustic impedance. Therefore, the combination of the helical vane and the perforated tube serves to rotate the air flow, deflect sound waves into the perforations and reflect sound waves (i.e., acoustic energy) back to turbocharger.

Accordingly, it is an object of the present invention to provide a turbocharger air induction housing which minimizes pressure losses, assists the functionality of the turbine wheel, and minimizes escape of turbocharger noise.

This and additional objects, features and advantages of the present invention will become clearer from the following specification of a preferred embodiment.

DESCRIPTION OF THE PREFERRED EMBODIMENT

Figure 1:
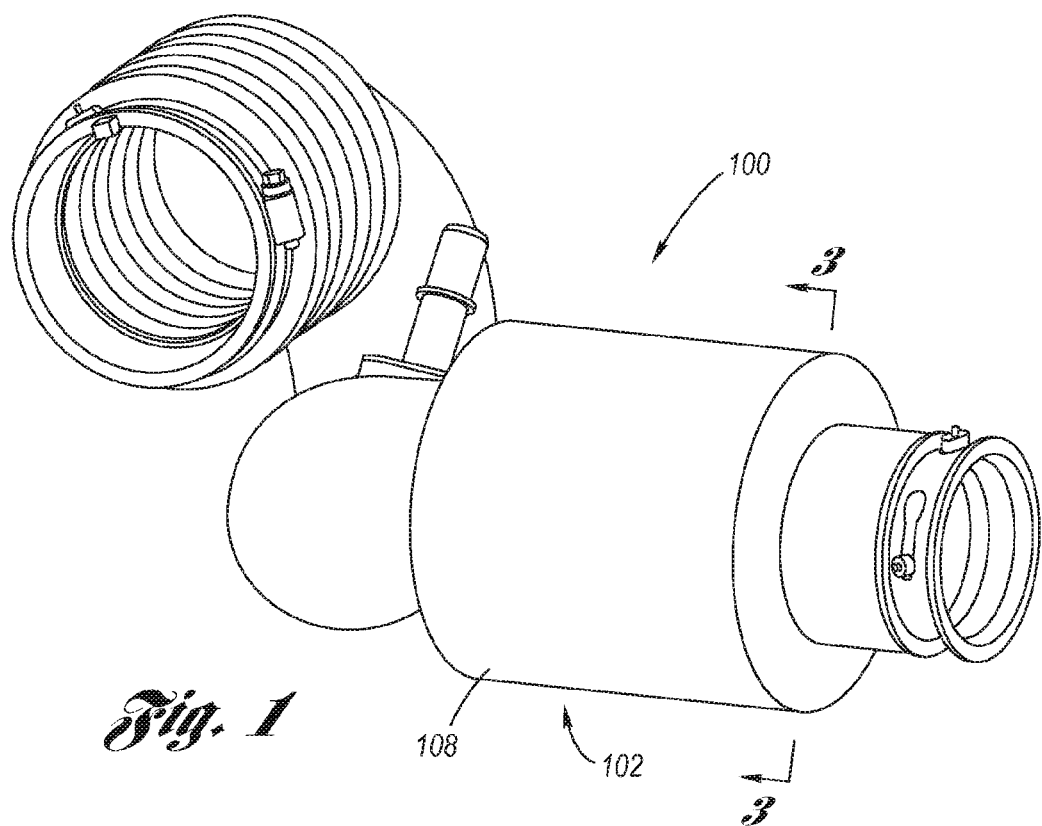
FIG. 1 is a perspective elevational view of an improved air induction system according to the present invention.

Referring now to the Drawings, FIGS. 1 through 10 depict examples of an improved air induction system for a turbocharger which minimizes pressure losses, assists the functionality of the turbine wheel, and minimizes escape of turbocharger noise.

Figure 2:
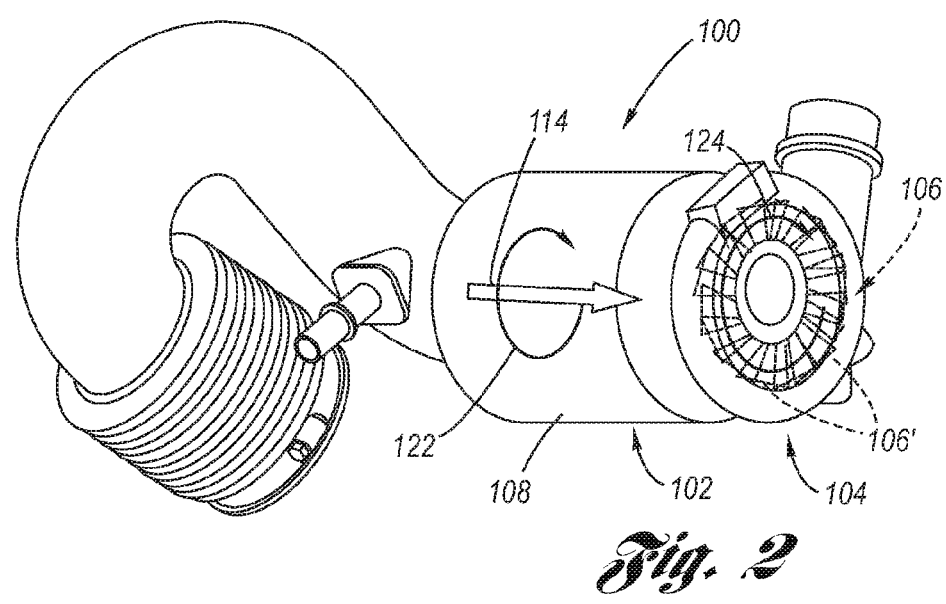
FIG. 2 is a perspective elevational view of the improved air induction system as in FIG. 1, shown operatively connected to a turbocharger.
Figure 3:
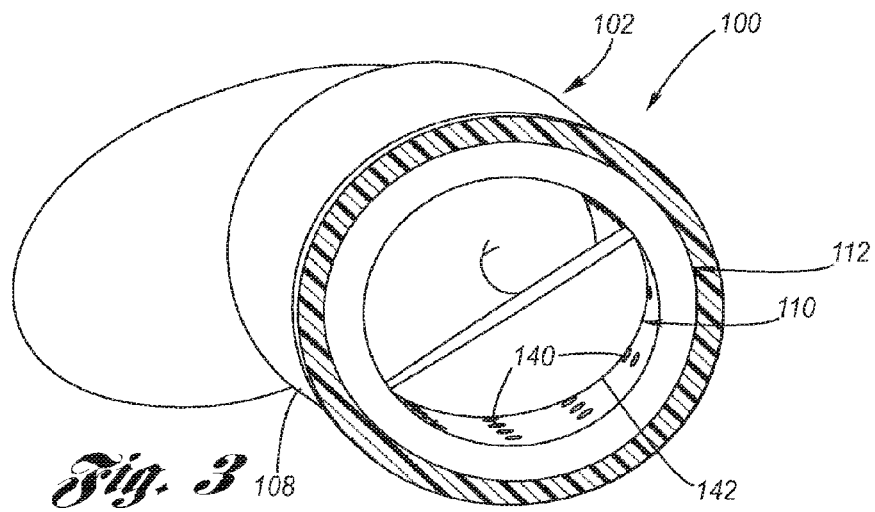
FIG. 3 is a partly sectional view, seen along line 3-3 of FIG. 1.

FIGS. 1 through 3 depict an example of an improved air induction system 100, showing an exemplar air induction housing 102 thereof, which may have other configurations (see for example the discussion hereinbelow of FIG. 10). The air induction housing 102 is connected to a turbocharger 104. Internal to the turbocharger 104 is a turbine wheel 106 having blades 106' which rotate in a predetermined direction of rotation 124 so as to draw air from the upstream disposed air induction housing 102 and deliver the air, now under compression, to a downstream engine intake manifold (not shown).

The air induction housing 102 includes a cylindrical main flow tube 108. Disposed within the main flow tube 108 is a helical vane 110, and, preferably, disposed between the helical vane 110 and the main flow tube 108 is a noise absorbing perforated tube 112. The helical vane 110 and the perforated tube 112 are mutually disposed within the main flow tube 108 such that the helical vane and the perforated tube are concentrically positioned in the air flow 114 (see FIG. 8) of the main flow tube. The helical vane 110 imparts to the air flow 114 an acquired air flow rotation 122 which rotation is in the same direction of rotation as that of the turbine wheel 106.

Figure 4:
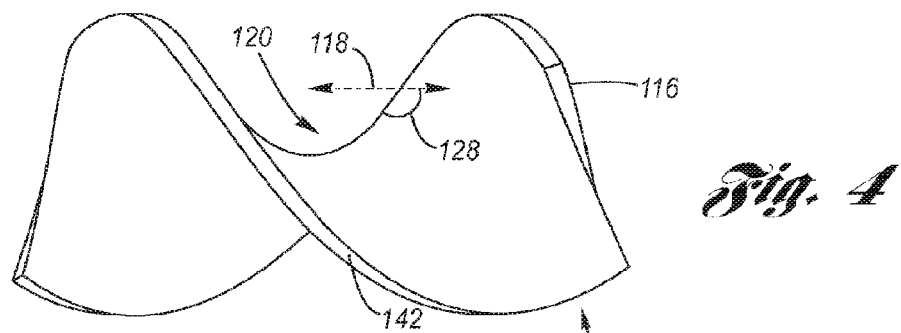
FIG. 4 is a side view of a helical vane according to the present invention.

As best shown at FIG. 4, the helical vane 110 has a spiraling body 116 which twists axially (see axis 118). This twist 120 of the spiraling body 116 is also axially along the main flow tube 108, and consequently acts to guide the air flow 114 axially along the main flow tube and thereby cause the air flow to acquire the air flow rotation 122. The direction of the twist 120 of the spiraling body 116 of the helical vane 110 is coordinated with the predetermined direction of rotation 124 of the turbine wheel 106 of the turbocharger 104 so that the acquired air flow rotation 122 of the air flow 114 is in the same direction of rotation as the rotation direction of the turbine wheel. The twist 120 provided by a helical twist angle 128 is preselected based upon, among various aspects, the anticipated rate of the air flow 114, as well as the length and diameter of the helical vane 110 so as to provide a desired acquired air flow rotation 122 is in best agreement with the operational characteristics of the turbine wheel 106. Merely by way of example, FIG. 4 shows the helical vane 110 having a 1.5 twist over a length of 120 mm; however, the twist per unit length can be any value suitable for a particular application.

Figure 5:
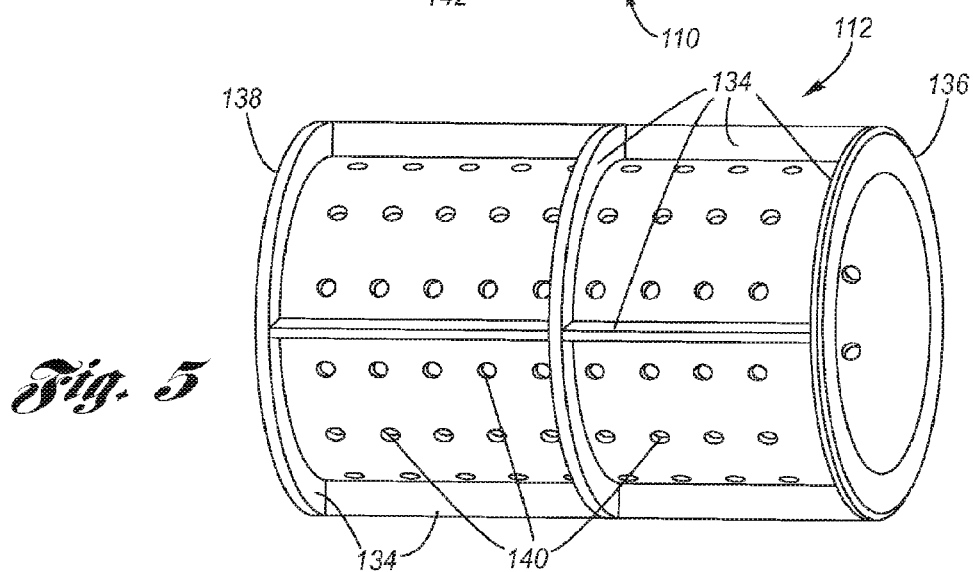
FIG. 5 is a side perspective view of a perforated cylinder according to the present invention.
Figure 6:
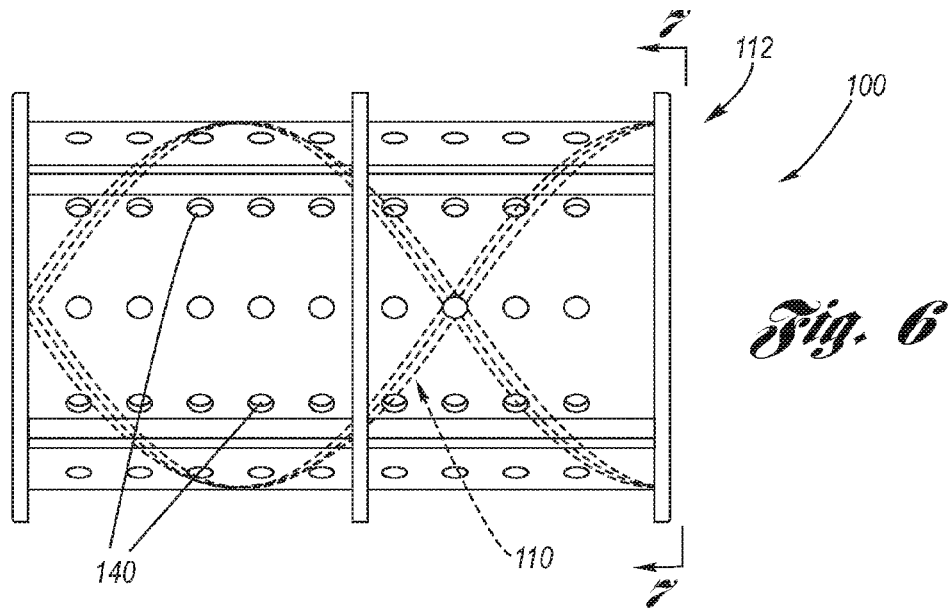
FIG. 6 is a side view of the perforated cylinder of FIG. 5, showing in phantom the concentrically disposed helical vane of FIG. 4.
Figure 7:
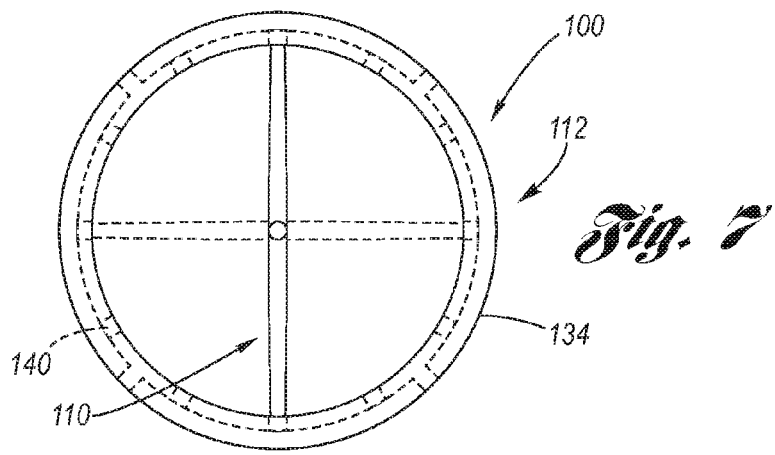
FIG. 7 is an end view, seen along line 7-7 of FIG. 6.

Turning attention now to FIG. 5, the noise absorbing perforated tube 112 is spaced in relation to the main flow tube 108 so as to form at least one acoustic cavity 130 (six acoustic cavities being provided at FIGS. 8 and 9) disposed between the main flow tube sidewall 108' of the main flow tube and the perforated tube sidewall 112' of the perforated tube. The separation spacing 132 is defined by a radially disposed embossment 134, which includes first and second boss seals 136, 138 at each end of the perforated tube 112. The perforated tube 112 has a multiplicity of perforations 140 formed in the perforated tube sidewall 112'. The perforated tube 112 serves to dissipate acoustic energy via the perforations 140 in conjunction with the acoustic cavity or cavities 130 when sound waves propagate through the air flow 114 of the air induction housing 102.

Figure 8:
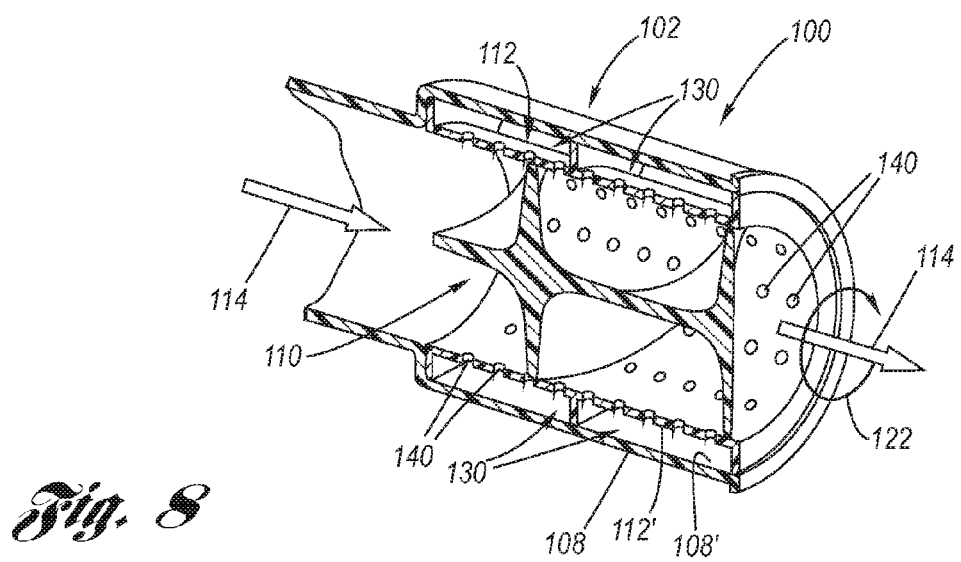
FIG. 8 is a perspective sectional view of the improved air induction system according to the present invention, shown operatively with respect to turbocharger induced air flow therewithin.
Figure 9:
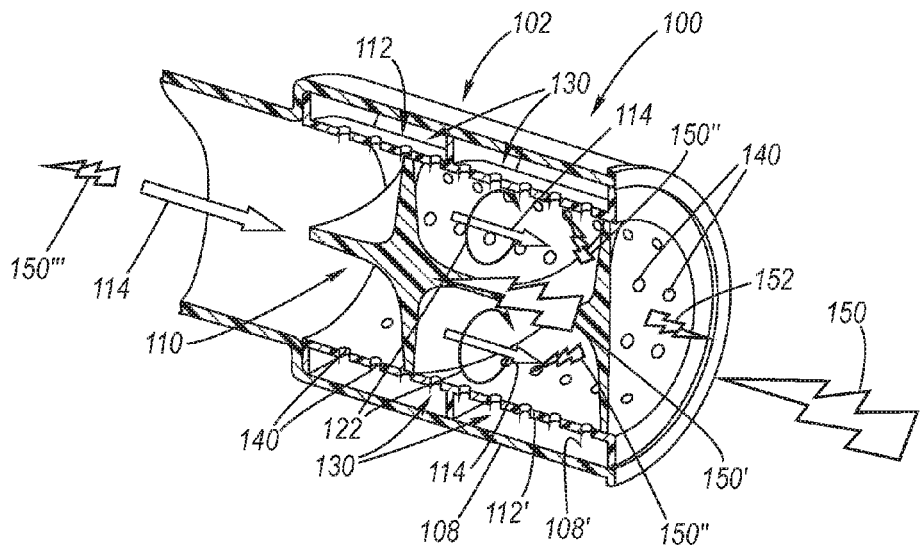
FIG. 9 is a sectional view of the improved air induction housing as in FIG. 8, now schematically further showing noise deflection and reflection aspects during the air flow.

As shown generally at FIGS. 3, 8 and 9, the outer periphery 142 of the helical vane 110 is connected (stationarily and sealingly) to the perforated tube sidewall 112'. In addition, the embossment 134 of the perforated tube 112 is connected (stationarily and sealingly) to the main flow tube sidewall 108', whereby the helical vane 110 is connected (stationarily and sealingly) to the main flow tube 108.

Turning attention now to FIGS. 8 and 9, operational aspects of the improved air induction system 100 will be detailed.

As shown at FIG. 8, air flow 114 induced by the aforementioned turbine wheel passes through the air induction housing 102, encountering the main flow tube 108. The helical vane 110 imparts to the air flow 114 an acquired air flow rotation 122 as the air flow passes guidingly along the surfaces of the spiraling body 116, wherein the direction of rotation of the air flow rotation 122 is the same as the direction of rotation 124 of the turbine wheel 106 (see FIG. 2).

As shown at FIG. 9, noise (i.e., sound waves or acoustic energy) 150 emanating from the turbine wheel (see FIG. 2) travels into the air induction housing 102 upstream of the flow direction of the air flow 114. Upon reaching the main flow tube 108, the noise 150 encounters the helical vane 110. An abrupt change in acoustic impedance occurs, which causes a portion of the noise 150 to be reflected and thereupon become reverse directed noise 152 traveling back toward the turbocharger (see FIG. 2). In addition, as the remaining noise 150' travels through the perforated tube 112, and some of the remaining noise 150" is pass into the perorations 140, where it is deadened by the acoustic cavity or cavities 130, wherein the air flow rotation 122 tends to deflect the remaining noise into the perforations 140, whereby acoustic deadening of the remaining noise is enhanced. The result of the reflection, deflection and deadening of the noise is such that the exiting noise 150''' is much attenuated as compared to the original noise 150.

The length of the perforated tube 112, the size of the acoustic cavity or cavities 130, the distribution and size of perforations 140, the helical twist angle 128 of the helical vane 110 are among the parameters which may be varied to achieve the desired performance levels of acquired air flow rotation 116 and noise attenuation for a particular application.

The acquired air flow rotation 122 provided by the improved air induction system 100 of the present invention has a number of advantages: reduction of the dynamic pressure load on the blades of the turbine wheel; increased turbocharger efficiency; generation of less heat, vibration and noise; and improved turbocharger durability.

With regard to noise attenuation, the synergism of the helical vane with respect to the perforated tube enhances noise attenuation of the acoustic cavity. In addition, the spiral vane reflects acoustic energy back in to turbocharger due to a change in acoustic impedance.

The combination of the helical vane and the perforated tube serves to rotate the air flow, deflect turbocharger noise into the perforations of the perforated tube where they are attenuated by the acoustic cavity, and reflect noise back to turbocharger.

Figure 10:
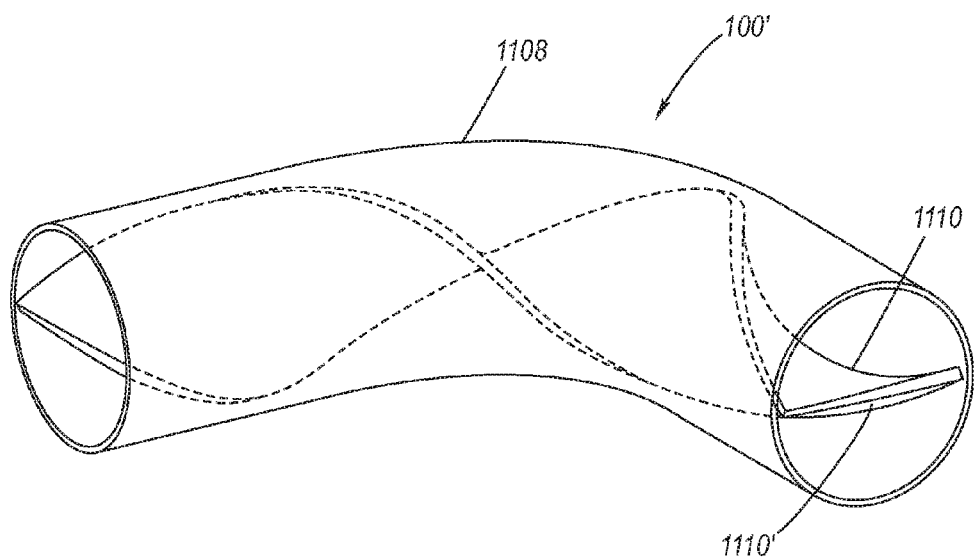
FIG. 10 is a perspective elevational view of an improved air induction system main flow tube in the form of an elbow, wherein disposed therewithin is a spiral vane according to the present invention.

FIG. 10 depicts an example of an intake housing system 100' of the present invention, wherein the main flow tube 1108 is curved, as for example at an elbow, wherein disposed therewithin is a helical vane 1110 having a periphery 1110' which is (stationarily and sealingly) connected to the main flow tube.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An air induction system and turbocharger, comprising:
   a turbocharger, comprising:
   a rotatable turbine wheel, said turbine wheel rotating in a predetermined direction of rotation; and
   an air induction system connected to said turbocharger, said air induction system comprising
   a main flow tube having a main flow tube sidewall; and
   a helical vane disposed within said main flow tube mounted in nonrotatable relation thereto;
   wherein air flow passing through said main flow tube in response to rotation of said turbine wheel acquires the predetermined direction of rotation during passage through said helical vane.

2. The air induction system and turbocharger of claim 1, further comprising a perforated tube disposed between said helical vane and said main flow tube, said perforated tube having a perforated tube sidewall which is perforated by a multiplicity of perforations.

3. The air induction system and turbocharger of claim 2, wherein said perforated tube is spaced with respect to said main flow tube to thereby provide at least one acoustic cavity disposed between said perforated tube sidewall and said main flow tube sidewall, said at least one acoustic cavity communicating with said multiplicity of perforations.

* * * * *